US012424776B2

(12) United States Patent
Westman et al.

(10) Patent No.: US 12,424,776 B2
(45) Date of Patent: Sep. 23, 2025

(54) CARD EDGE CONNECTOR

(71) Applicant: TE Connectivity Solutions GmbH, Schaffhausen (CH)

(72) Inventors: John Eugene Westman, Harrisburg, PA (US); Michael Eugene Shirk, Grantville, PA (US); Michael John Phillips, Camp Hill, PA (US); Sandeep Patel, Aurora, CO (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 471 days.

(21) Appl. No.: 17/736,128

(22) Filed: May 4, 2022

(65) Prior Publication Data

US 2023/0361495 A1 Nov. 9, 2023

(51) Int. Cl.
*H01R 12/72* (2011.01)
*H01R 13/648* (2006.01)
*H01R 13/6586* (2011.01)

(52) U.S. Cl.
CPC ......... *H01R 12/721* (2013.01); *H01R 13/648* (2013.01); *H01R 13/6586* (2013.01)

(58) Field of Classification Search
CPC ................ H01R 12/721; H01R 13/648; H01R 13/6585; H01R 13/6586; H01R 13/6581; H01R 13/6587; H01R 13/6588; H01R 13/659
See application file for complete search history.

(56) References Cited

U.S. PATENT DOCUMENTS

| | | | | |
|---|---|---|---|---|
| 10,396,513 | B2 * | 8/2019 | Regnier | H01R 12/75 |
| 10,403,565 | B1 * | 9/2019 | Henry | H01R 13/6596 |
| 11,735,846 | B2 * | 8/2023 | Phillips | H01R 12/721 439/631 |
| 2016/0064869 | A1 * | 3/2016 | Yu | H01R 13/6596 439/607.05 |
| 2018/0076581 | A1 * | 3/2018 | Tsai | H01R 13/6585 |

* cited by examiner

*Primary Examiner* — Renee S Luebke
*Assistant Examiner* — Paul D Baillargeon

(57) ABSTRACT

A contact assembly includes a contact positioner having a front slot configured to receive a card edge of a module circuit board of a pluggable module. An upper contact array is coupled to the contact positioner and includes upper contacts and an upper ground shield. The upper ground shield includes an upper ground panel extending along a first side of the upper contacts and an upper ground plate extending along a second side of the upper contacts parallel to and spaced apart from the upper ground panel with the upper contacts therebetween. The contact assembly includes a lower contact array coupled to the contact positioner having lower contacts and a lower ground shield with lower ground panel and a lower ground plate parallel to and spaced apart from the lower ground panel with the lower contacts therebetween.

20 Claims, 6 Drawing Sheets

CARD EDGE CONNECTOR

BACKGROUND OF THE INVENTION

The subject matter herein relates generally to card edge connectors of communication systems.

Some communication systems utilize communication connectors, such as card edge connectors to interconnect various components of the system for data communication. Some known communication systems use pluggable modules, such as I/O modules or circuit cards, which are electrically connected to the card edge connectors. The pluggable modules have module circuit boards having card edges that are mated with the card edge connectors during the mating operation. Each card edge connector typically has an upper row of contacts and a lower row of contacts for mating with the corresponding circuit board. There is a need for connectors and circuit boards of communication systems to have greater contact density and/or data throughput. Known card edge connectors are not without disadvantages. For instance, large sections of the contacts are typically rigidly fixed within the connector housing, such as using a contact overmold to hold the contacts relative to each other and relative to the housing. The overmold may negatively affect the electrical characteristics of the signal transmission lines. Properly shielding the signal transmission lines is problematic. Additionally, properly positioning the mating ends and the terminating ends of all of the contacts is difficult to control.

A need remains for a reliable card edge connector.

BRIEF DESCRIPTION OF THE INVENTION

In one embodiment, a contact assembly is provided and includes a contact positioner having a central wall and a rear wall. The contact positioner includes a front slot at a front of the contact positioner configured to receive a card edge of a module circuit board of a pluggable module. The contact assembly includes an upper contact array coupled to the contact positioner. The upper contact array includes upper contacts held by an upper contact holder. The upper contacts extend to the front slot to mate with the module circuit board. The upper contact array includes an upper ground shield has an upper ground panel extend along a first side of the upper contacts. The upper contact array includes an upper ground plate extend along a second side of the upper contacts. The upper ground plate is parallel to and spaced apart from the upper ground panel with the upper contacts therebetween. The upper ground plate is electrically connected to the upper ground shield. The contact assembly includes a lower contact array coupled to the contact positioner. The lower contact array includes lower contacts held by a lower contact holder. The lower contacts extend to the front slot to mate with the module circuit board. The lower contact array includes a lower ground shield has a lower ground panel extend along a first side of the lower contacts. The lower contact array includes a lower ground plate extend along a second side of the lower contacts. The lower ground plate is parallel to and spaced apart from the lower ground panel with the lower contacts therebetween. The lower ground plate is electrically connected to the lower ground shield.

In another embodiment, a card edge connector for mating with a pluggable module is provided. The card edge connector includes a housing including a top and a bottom. The housing has a front and a rear. The housing has a first side and a second side. The bottom configured to be mounted to a host circuit board. The housing includes a cavity at the rear. The housing includes a card slot open to the cavity at the front of the housing. The card slot configured to receive a card edge of a module circuit board of the pluggable module. The card edge connector includes a contact assembly received in the cavity. The contact assembly has a contact positioner holding an upper contact array and a lower contact array. The contact positioner has a central wall and a rear wall. The contact positioner received in the cavity and coupled to the housing. The contact positioner includes a front slot aligned with the card slot to receive the card edge of the module circuit board. The upper contact array includes upper contacts held by an upper contact holder. The upper contacts extend to the front slot to mate with the module circuit board. The upper contact array includes an upper ground shield has an upper ground panel extend along a first side of the upper contacts. The upper contact array includes an upper ground plate extend along a second side of the upper contacts. The upper ground plate is parallel to and spaced apart from the upper ground panel with the upper contacts therebetween. The upper ground plate is electrically connected to the upper ground shield. The lower contact array includes lower contacts held by a lower contact holder. The lower contacts extend to the front slot to mate with the module circuit board. The lower contact array includes a lower ground shield has a lower ground panel extend along a first side of the lower contacts. The lower contact array includes a lower ground plate extend along a second side of the lower contacts. The lower ground plate is parallel to and spaced apart from the lower ground panel with the lower contacts therebetween. The lower ground plate is electrically connected to the lower ground shield.

In a further embodiment, a card edge connector for mating with a pluggable module is provided. The card edge connector includes a housing including a top and a bottom. The housing has a front and a rear. The housing has a first side and a second side. The bottom configured to be mounted to a host circuit board. The housing includes a cavity at the rear. The housing includes an inner contact channel and an outer contact channel. The inner contact channel closer to the bottom and the host circuit board. The housing includes an inner card slot open to the inner contact channel at the front of the housing. The housing includes an outer card slot open to the outer contact channel at the front of the housing. The inner and outer card slots configured to receive card edges of module circuit boards of the stacked pluggable modules. The card edge connector includes an inner contact assembly received in the cavity. The inner contact assembly has an inner contact positioner holding inner contacts. The inner contact positioner is positioned in the inner contact channel aligned with the inner card slot to receive the card edge of the module circuit board. The inner contacts configured to be electrically connected to the host circuit board and configured to be electrically connected to the corresponding module circuit board. The card edge connector includes an outer contact assembly received in the cavity. The outer contact assembly has an outer contact positioner holding outer contacts in an upper contact array and a lower contact array. The outer contacts configured to be electrically connected to the host circuit board and configured to be electrically connected to the corresponding module circuit board. The outer contact positioner includes a front slot aligned with the outer card slot to receive the card edge of the corresponding module circuit board. The upper contact array includes upper contacts held by an upper contact holder. The upper contacts extend to the front slot to mate with the module circuit board. The upper contact array includes an upper ground shield has an upper ground panel extend along a first side of the upper contacts. The upper contact array includes an upper ground plate extend along a second side of the upper contacts. The upper ground plate is parallel to and spaced apart from the upper ground panel with the upper contacts therebetween. The upper ground plate is electrically connected to the upper ground shield. The lower contact array includes lower contacts held by a lower contact holder. The lower contacts extend to the front slot to mate with the module circuit board. The lower contact array includes a lower ground shield has a lower ground panel extend along a first side of the lower contacts. The lower contact array includes a lower ground plate extend along a second side of the lower contacts. The lower ground plate is parallel to and spaced apart from the lower ground panel with the lower contacts therebetween. The lower ground plate is electrically connected to the lower ground shield.

DETAILED DESCRIPTION OF THE INVENTION

Figure 1:
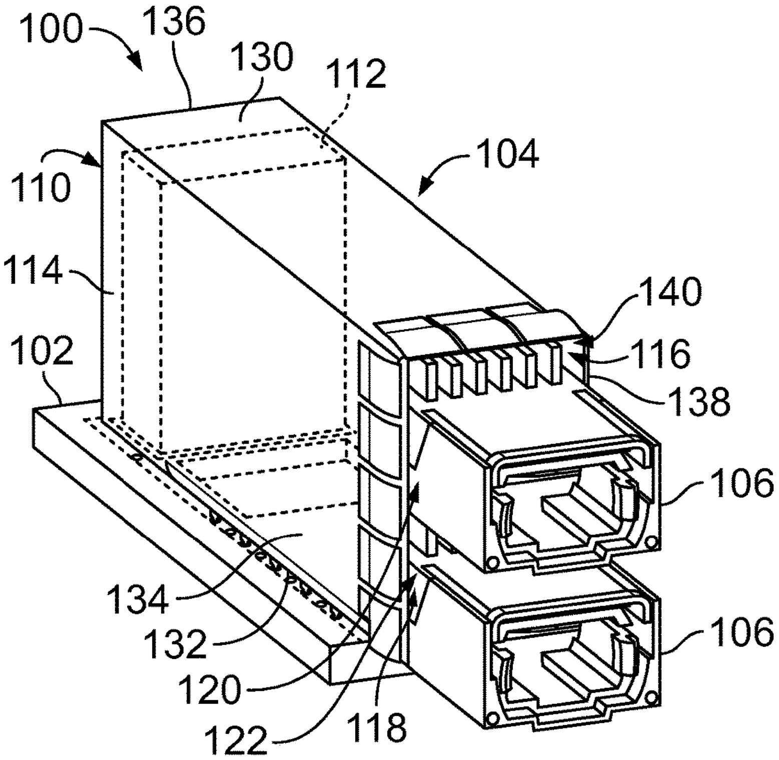
FIG. 1 is a front perspective view of a communication system formed in accordance with an exemplary embodiment.

FIG. 1 is a front perspective view of a communication system 100 formed in accordance with an exemplary embodiment. The communication system 100 includes a circuit board 102 and a receptacle connector assembly 104 mounted to the circuit board 102. Pluggable modules 106 are configured to be electrically connected to the receptacle connector assembly 104. The pluggable modules 106 are electrically connected to the circuit board 102 through the receptacle connector assembly 104.

In an exemplary embodiment, the receptacle connector assembly 104 includes a receptacle cage 110 and an electrical connector assembly 112 (shown in phantom) adjacent the receptacle cage 110. For example, in the illustrated embodiment, the electrical connector assembly 112 is received in the receptacle cage 110. In other various embodiments, the electrical connector assembly 112 may be located rearward of the receptacle cage 110. In various embodiments, the electrical connector assembly 112 is a card edge connector and may be referred to hereinafter as a card edge connector 112.

In various embodiments, the receptacle cage 110 is enclosed and provides electrical shielding for the electrical connector assembly 112. The pluggable modules 106 are loaded into the receptacle cage 110 and are at least partially surrounded by the receptacle cage 110. The receptacle cage 110 includes a plurality of walls 114 that define one or more module channels for receipt of corresponding pluggable modules 106. The walls 114 may be walls defined by solid sheets, perforated walls to allow airflow therethrough, walls with cutouts, such as for a heatsink or heat spreader to pass therethrough, or walls defined by rails or beams with relatively large openings, such as for airflow therethrough. In an exemplary embodiment, the receptacle cage 110 is a shielding, stamped and formed metallic cage member with the walls 114 being shielding walls 114. In other embodiments, the receptacle cage 110 may be open between frame members, such as rails or beams, to provide cooling airflow for the pluggable modules 106 with the frame members of the receptacle cage 110 defining guide tracks for guiding loading of the pluggable modules 106 into the receptacle cage 110.

In the illustrated embodiment, the receptacle cage 110 constitutes a stacked cage member having an upper module channel 116 and a lower module channel 118. The upper module channel 116 is located outward of (further from the host circuit board 102) the lower module channel 118. The lower module channel 118 is located inward of (closer to the host circuit board 102) the upper module channel 116. The receptacle cage 110 has upper and lower module ports 120, 122 that open to the module channels 116, 118 that receive the pluggable modules 106. Any number of module channels may be provided in various embodiments. In the illustrated embodiment, the receptacle cage 110 includes the upper and lower module channels 116, 118 arranged in a single column, however, the receptacle cage 110 may include multiple columns of ganged module channels 116, 118 in alternative embodiments (for example, 2×2, 3×2, 4×2, 4×3, etc.). The receptacle connector assembly 104 is configured to mate with the pluggable modules 106 in both stacked module channels 116, 118. Optionally, multiple electrical connector assemblies 112 may be arranged within the receptacle cage 110, such as when multiple columns of module channels 116, 118 are provided.

In an exemplary embodiment, the walls 114 of the receptacle cage 110 include a top wall 130, a bottom wall 132, and side walls 134 extending between the top wall 130 and the bottom wall 132. The bottom wall 132 may rest on the circuit board 102. However, in alternative embodiments, the bottom wall 132 may be elevated a distance above the circuit board 102 defining a gap below the bottom wall 132, such as for airflow. In other various embodiments, the receptacle cage 110 may be provided without the bottom wall 132. Optionally, the walls 114 of the receptacle cage 110 may include a rear wall 136 and a front wall 138 at the front of the receptacle cage 110. The module ports 120, 122 are provided in the front wall 138. The walls 114 define a cavity 140. For example, the cavity 140 may be defined by the top wall 130, the bottom wall 132, the side walls 134, the rear wall 136 and the front wall 138.

In an exemplary embodiment, other walls 114 may separate or divide the cavity 140 into the various module channels 116, 118. For example, the walls 114 may include a channel separator between the upper and lower module channels 116, 118. The channel separator may form a space between the upper and lower module channels 116, 118, such as for airflow, for a heat sink, for routing light pipes, or for other purposes. For example, the channel separator includes an upper panel, a lower panel and a front panel between the upper and lower panels. In other various embodiments, the walls 114 may include a divider walls extending between the top wall 130 and the bottom wall 132 to separate ganged module channels from each other. The divider walls are parallel to the side walls 134.

In an exemplary embodiment, the receptacle cage 110 may include one or more gaskets at the front wall 138 for providing electrical shielding for the module channels 116, 118. For example, the gaskets may be configured to electrically connect with the pluggable modules 106 received in the corresponding module channels 116, 118. The gaskets may be configured to electrically connect to a panel or bezel.

In an exemplary embodiment, the receptacle connector assembly 104 may include one or more heat sinks for dissipating heat from the pluggable modules 106. For example, the heat sink may be coupled to the top wall 130 for engaging the upper pluggable module 106 received in the upper module channel 116. The heat sink may extend through an opening in the top wall 130 to directly engage the pluggable module 106. Other types of heat sinks may be provided in alternative embodiments.

In an exemplary embodiment, the electrical connector assembly 112 is received in the cavity 140, such as proximate to the rear wall 136. However, in alternative embodiments, the electrical connector assembly 112 may be located behind the rear wall 136 exterior of the receptacle cage 110 and extend into the cavity 140 to interface with the pluggable module(s) 106. In an exemplary embodiment, a single electrical connector assembly 112 is used to electrically connect with the pair of stacked pluggable modules 106 in the upper and lower module channels 116, 118.

In an exemplary embodiment, the pluggable modules 106 are loaded through the front wall 138 to mate with the electrical connector assembly 112. The shielding walls 114 of the receptacle cage 110 provide electrical shielding around the electrical connector assembly 112 and the pluggable modules 106, such as around the mating interfaces between the electrical connector assembly 112 and the pluggable modules 106.

Figure 2:
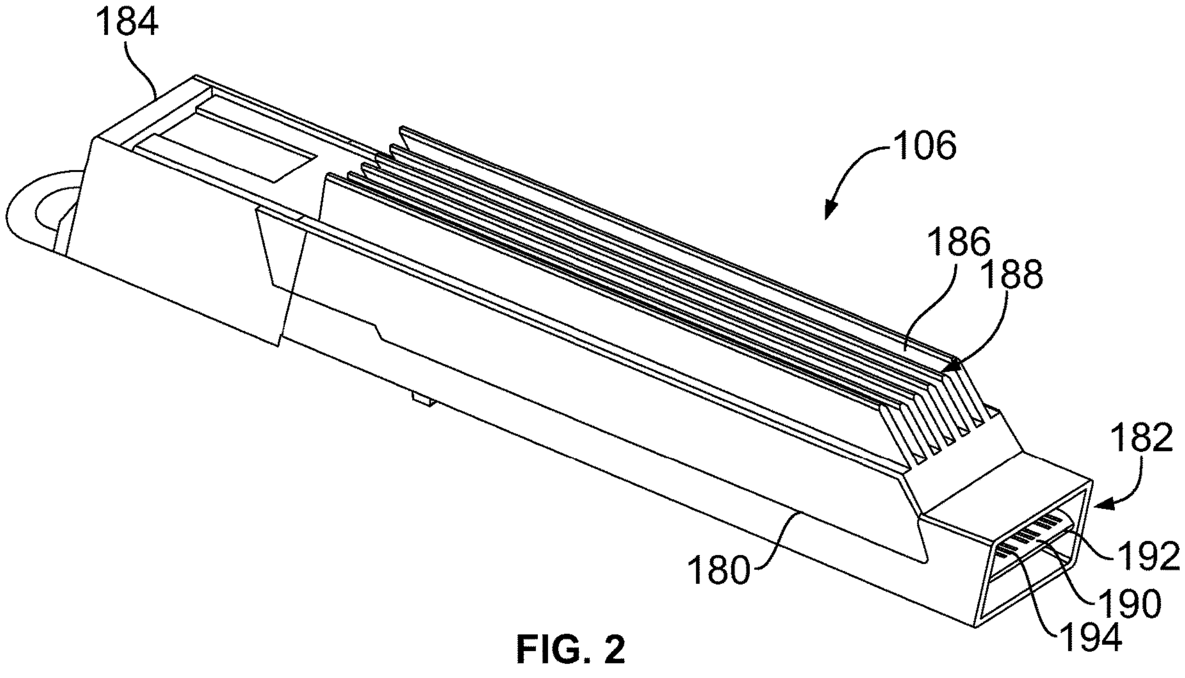
FIG. 2 is a rear perspective view of the pluggable module in accordance with an exemplary embodiment.

FIG. 2 is a rear perspective view of the pluggable module 106 in accordance with an exemplary embodiment. The pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 and an opposite front end 184. The mating end 182 is configured to be inserted into the corresponding module channel 116 or 118 (shown in FIG. 1). The front end 184 may be a cable end having a cable extending therefrom to another component within the system.

The pluggable module 106 includes a module circuit board 190 that is configured to be communicatively coupled to the electrical connector assembly 112 (shown in FIG. 1). The module circuit board 190 may be accessible at the mating end 182. The module circuit board 190 has a card edge 192 extending between a first or upper surface and a second or lower surface at a mating end of the module circuit board 190. The module circuit board 190 includes mating contacts 194, such as pads or circuits, at the card edge 192 configured to be mated with the card edge connector 112. In an exemplary embodiment, the mating contacts 194 are provided on the upper surface and the lower surface. The module circuit board 190 may include components, circuits and the like used for operating and or using the pluggable module 106. For example, the module circuit board 190 may have conductors, traces, pads, electronics, sensors, controllers, switches, inputs, outputs, and the like associated with the module circuit board 190, which may be mounted to the module circuit board 190, to form various circuits.

In other various embodiments, the pluggable module 106 may be a circuit card rather than an I/O module. For example, the pluggable module 106 may include the module circuit board 190 without the pluggable body 180 surrounding the module circuit board 190.

In an exemplary embodiment, the pluggable body 180 provides heat transfer for the module circuit board 190, such as for the electronic components on the module circuit board 190. For example, the module circuit board 190 is in thermal communication with the pluggable body 180 and the pluggable body 180 transfers heat from the module circuit board 190. In an exemplary embodiment, the pluggable body 180 includes a plurality of heat transfer fins 186 along at least a portion of the outer perimeter of the pluggable module 106. The fins 186 transfer heat away from the main shell of the pluggable body 180, and thus from the module circuit board 190 and associated components. The fins 186 are separated by gaps 188 that allow airflow or other cooling flow along the surfaces of the fins 186 to dissipate the heat therefrom. In the illustrated embodiment, the fins 186 are parallel plates that extend lengthwise; however the fins 186 may have other shapes in alternative embodiments, such as cylindrical or other shaped posts. The pluggable module 106 may be provided without the heat transfer fins 186 in alternative embodiments.

In alternative embodiments, the pluggable module 106 may be provided without the pluggable body 180. For example, the pluggable module 106 may simply include the module circuit board 190. For example, the module circuit board 190 may be a paddle card.

Figure 3:
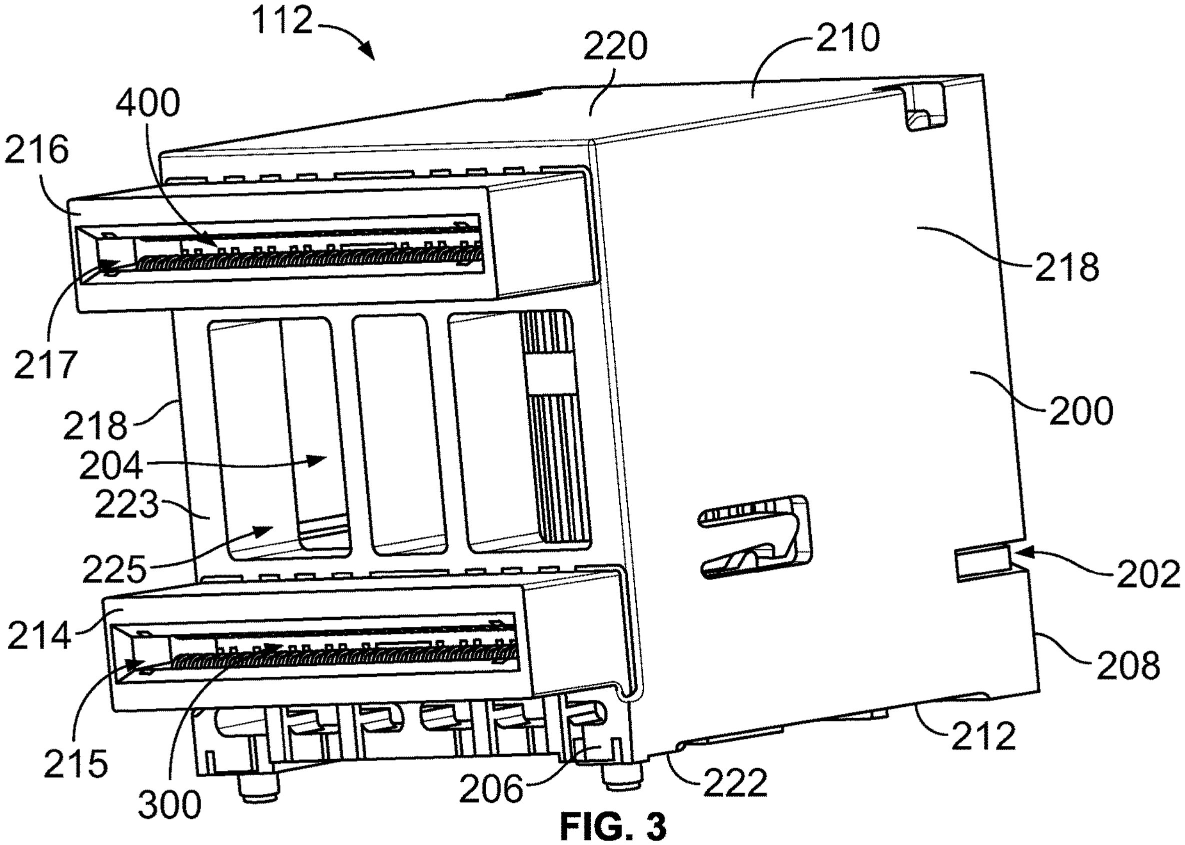
FIG. 3 is a front perspective view of the card edge connector in accordance with an exemplary embodiment.
Figure 4:
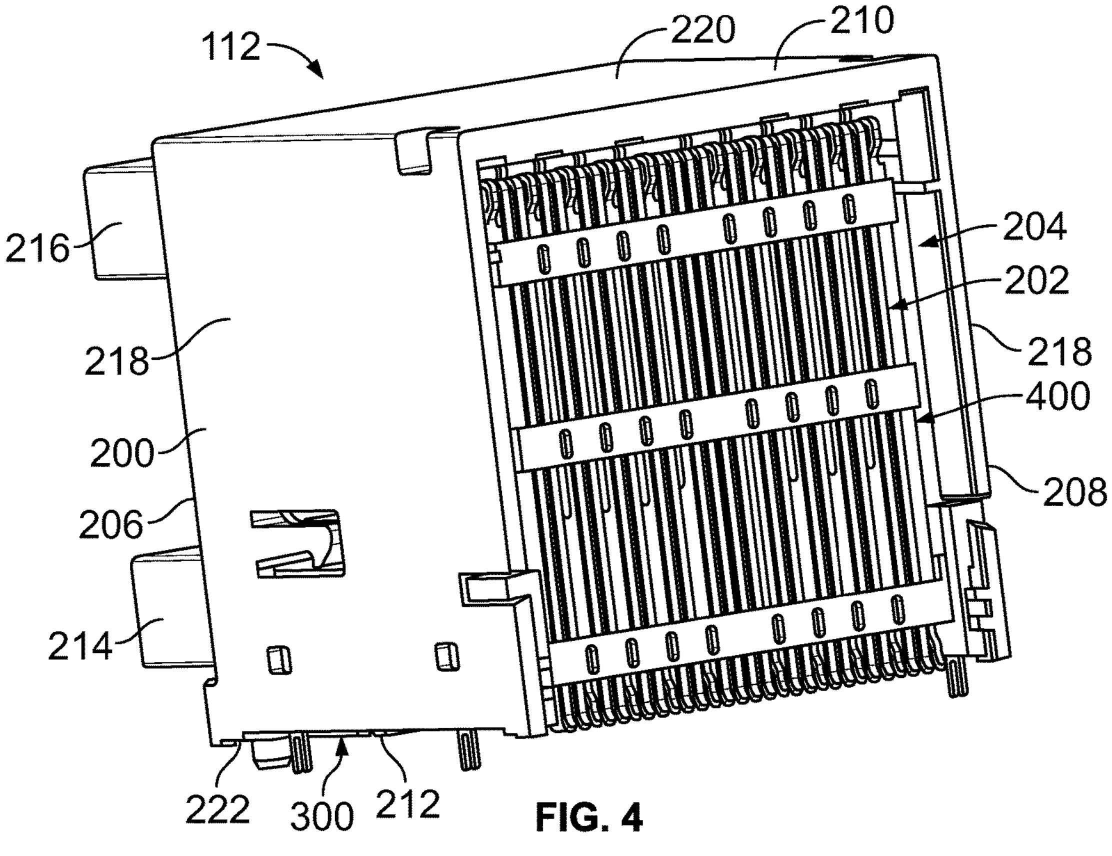
FIG. 4 is a rear perspective view of the card edge connector in accordance with an exemplary embodiment.

FIG. 3 is a front perspective view of the card edge connector 112 in accordance with an exemplary embodiment. FIG. 4 is a rear perspective view of the card edge connector 112 in accordance with an exemplary embodiment. The card edge connector 112 includes a housing 200 having a cavity 204 and a contact assembly 202 received in the cavity 204 of the housing 200.

The housing 200 extends between a front 206 and a rear 208. The cavity 204 is open at the rear 208 to receive the contact assembly 202. The housing 200 extends between a top 210 and a bottom 212. The housing 200 extends between opposite sides 218. The housing 200 may be generally box shaped in various embodiments. In the illustrated embodiment, the bottom 212 defines a mounting end configured to be mounted to the host circuit board 102 (shown in FIG. 1) and the front 206 defines the mating end configured to be mated with the pluggable module 106 (shown in FIG. 1). Other orientations are possible in alternative embodiments.

The housing 200 includes a top wall 220 at the top 210 and a bottom wall 222 at the bottom 212. In the illustrated embodiment, the housing 200 includes an inner shroud 214 and an outer shroud 216 at the front 206 configured to be mated with the pluggable modules 106. The outer shroud 216 is located above the inner shroud 214 closer to the top 210. The inner shroud 214 is located below the outer shroud 216 and is configured to be closer to the host circuit board 102. The shrouds 214, 216 are nose-cones configured to be plugged into the mating ends of the pluggable module 106. The inner shroud 214 includes an inner housing card slot 215 and the outer shroud 216 includes an outer housing card slot

217. The housing card slots 215, 217 are open at the front of the shrouds 214, 216. The housing card slots 215, 217 receive the card edges 192 (shown in FIG. 2) of the module circuit boards 190 (shown in FIG. 2).

In an exemplary embodiment, the contact assembly 202 includes an inner contact assembly 300 and an outer contact assembly 400. The inner contact assembly 300 is positioned interior of the outer contact assembly 400. The inner contact assembly 300 is loaded in the cavity 204 and received in the inner shroud 214 for mating with the inner (lower) pluggable module 106. The outer contact assembly 400 is loaded in the cavity 204 and received in the outer shroud 216 for mating with the outer (upper) pluggable module 106.

In an exemplary embodiment, the housing 200 includes a front wall 223 between the inner shroud 214 and the outer shroud 216. The front wall 223 includes openings 225 therethrough. The openings 225 allow airflow through the housing 200, such as for cooling the pluggable modules 106.

Figure 5:
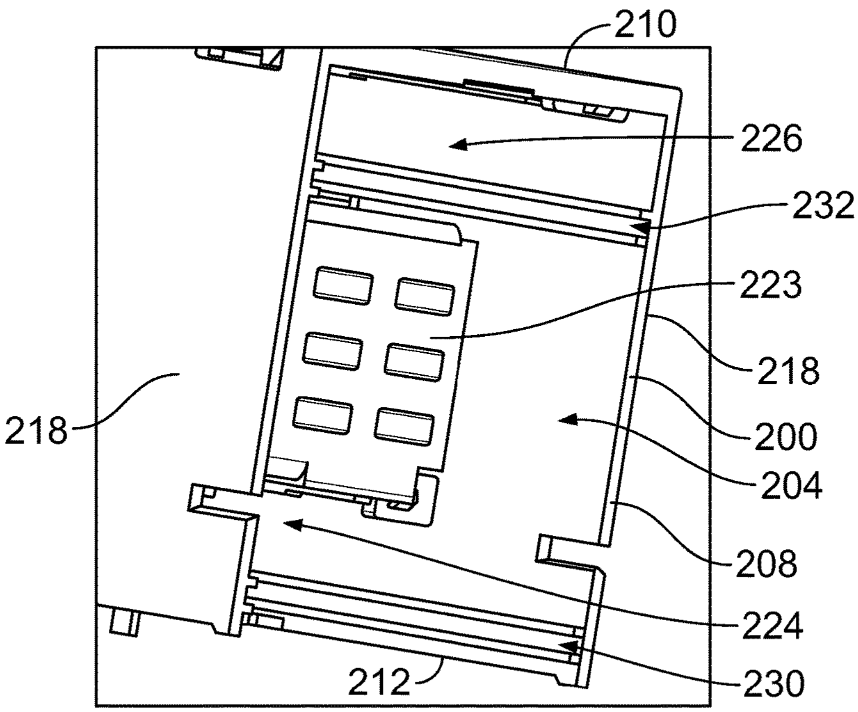
FIG. 5 is a rear view of a portion of the housing in accordance with an exemplary embodiment.

FIG. 5 is a rear view of a portion of the housing 200 in accordance with an exemplary embodiment. FIG. 5 shows the cavity 204, which is open at the rear 208. Such as to receive the contact assembly 202 (shown in FIG. 4). In an exemplary embodiment, the housing 200 includes an inner contact channel 224 at the bottom 212 and an outer contact channel 226 at the top 210. The inner contact channel 224 is located below the outer contact channel 226. The front wall 223 is located between the inner contact channel 224 and the outer contact channel 226. The inner contact channel 224 extends into the inner shroud 214. The outer contact channel 226 extends into the outer shroud 216. The inner contact channel 224 receives the inner contact assembly 300 (FIG. 4). The outer contact channel 226 receives the outer contact assembly 400 (FIG. 4).

In an exemplary embodiment, the housing 200 includes inner housing locating features 230 proximate to the bottom 212 and outer housing locating features 232 proximate to the top 210. The inner housing locating features 230 are used to position the inner contact assembly 300 in the housing 200. The outer housing locating features 232 are used to position the outer contact assembly 400 in the housing 200. The housing locating features 230, 232 are provided along the sides 218 proximate to the bottom 212 and the top 210, respectively. In an exemplary embodiment, the housing locating features 230, 232 may include rails, ribs, tabs, slots, openings, or other types of locating features configured to interface with the contact assemblies 300, 400.

Figure 6:
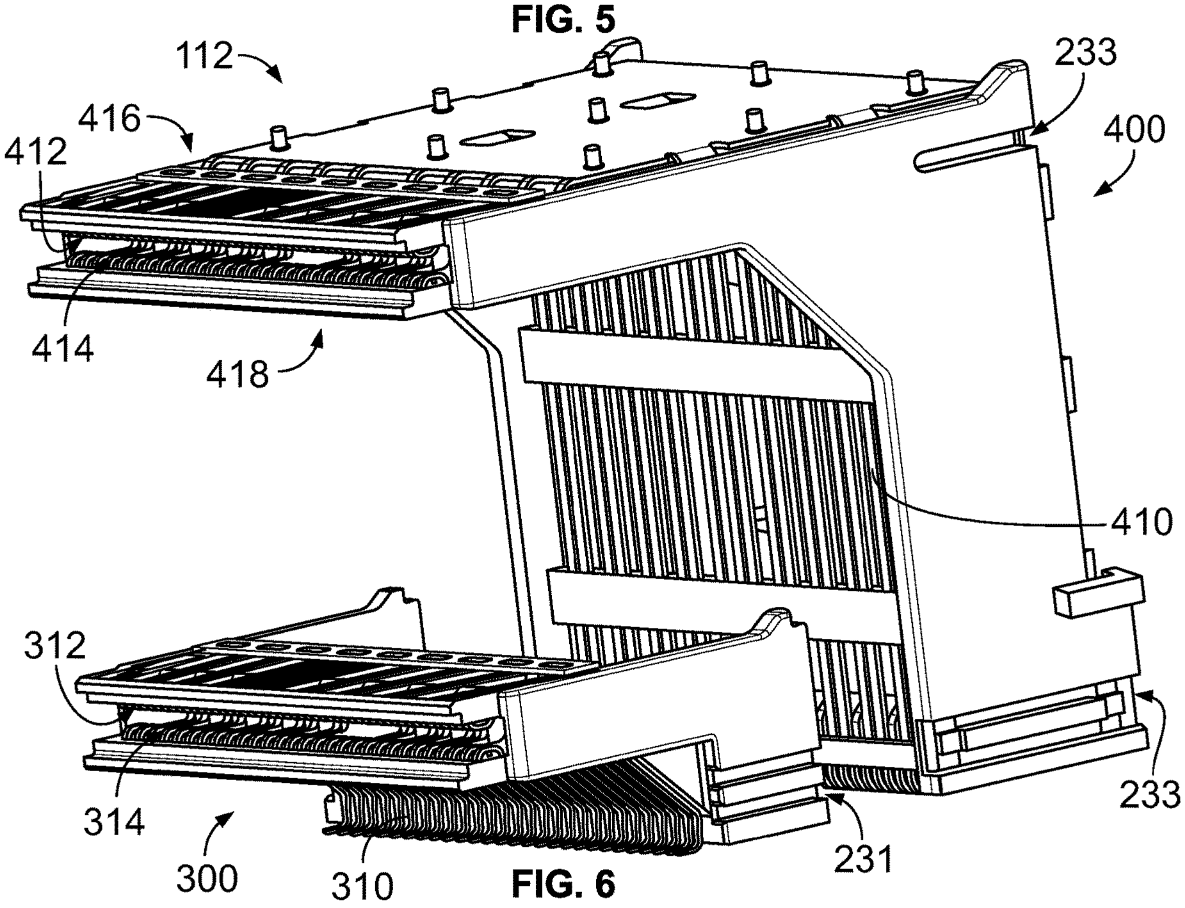
FIG. 6 is a front perspective view of a portion of the card edge connector in accordance with an exemplary embodiment showing the contact assembly.

FIG. 6 is a front perspective view of a portion of the card edge connector 112 in accordance with an exemplary embodiment showing the contact assembly 202. The contact assembly 202 includes the inner contact assembly 300 and the outer contact assembly 400. The inner contact assembly 300 is positioned interior of the outer contact assembly 400. The inner contact assembly 300 is configured to be coupled to the inner (lower) pluggable module 106 (FIG. 1) and the outer contact assembly 400 is configured to be coupled to the outer (upper) pluggable module 106 (FIG. 1).

In an exemplary embodiment, the inner contact assembly 300 is a double-sided, multi-row contact assembly. For example, the inner contact assembly 300 includes inner contacts 310, which include (inner) upper contacts 312 and (inner) lower contacts 314 arranged on opposite sides of the card slot. The upper contacts 312 are arranged in multiple rows (front row and rear row) and the lower contacts 314 are arranged in multiple rows (front row and rear row). As such, the inner contact assembly 300 has high density and significant data throughput.

In an exemplary embodiment, the outer contact assembly 400 is a double-sided, multi-row contact assembly. For example, the outer contact assembly 400 includes outer contacts 410, which include (outer) upper contacts 412 and (outer) lower contacts 414 arranged on opposite sides of the card slot. The upper contacts 412 are arranged in an upper contact array 416. The lower contacts 414 are arranged in a lower contact array 418. The upper contacts 412 may be arranged in a single row or may be arranged in multiple rows (front row and rear row) to increase the density. The lower contacts 414 may be arranged in a single row or may be arranged in multiple rows (front row and rear row) to increase the density.

With additional reference back to FIG. 5, the contact assemblies 300, 400 are configured to be loaded into the cavity 204 of the housing 200. For example, the contact assemblies 300, 400 are loaded through the rear 208 into the cavity 204. The inner contact assembly 300 is configured to be loaded into the inner contact channel 224 at the bottom 212. The inner contact assembly 300 includes inner locating features 231 configured to interface with the inner housing locating features 230. For example, the inner locating features 231 are slots and the inner housing locating features 230 are rails configured to guide mating of the inner contact assembly 300 with the housing 200. The outer contact assembly 400 is configured to be loaded into the outer contact channel 226 at the top 210. The outer contact assembly 400 includes outer locating features 233 configured to interface with the outer housing locating features 232. For example, the outer locating features 233 are slots and the outer housing locating features 232 are rails configured to guide mating of the outer contact assembly 400 with the housing 200.

Figure 7:
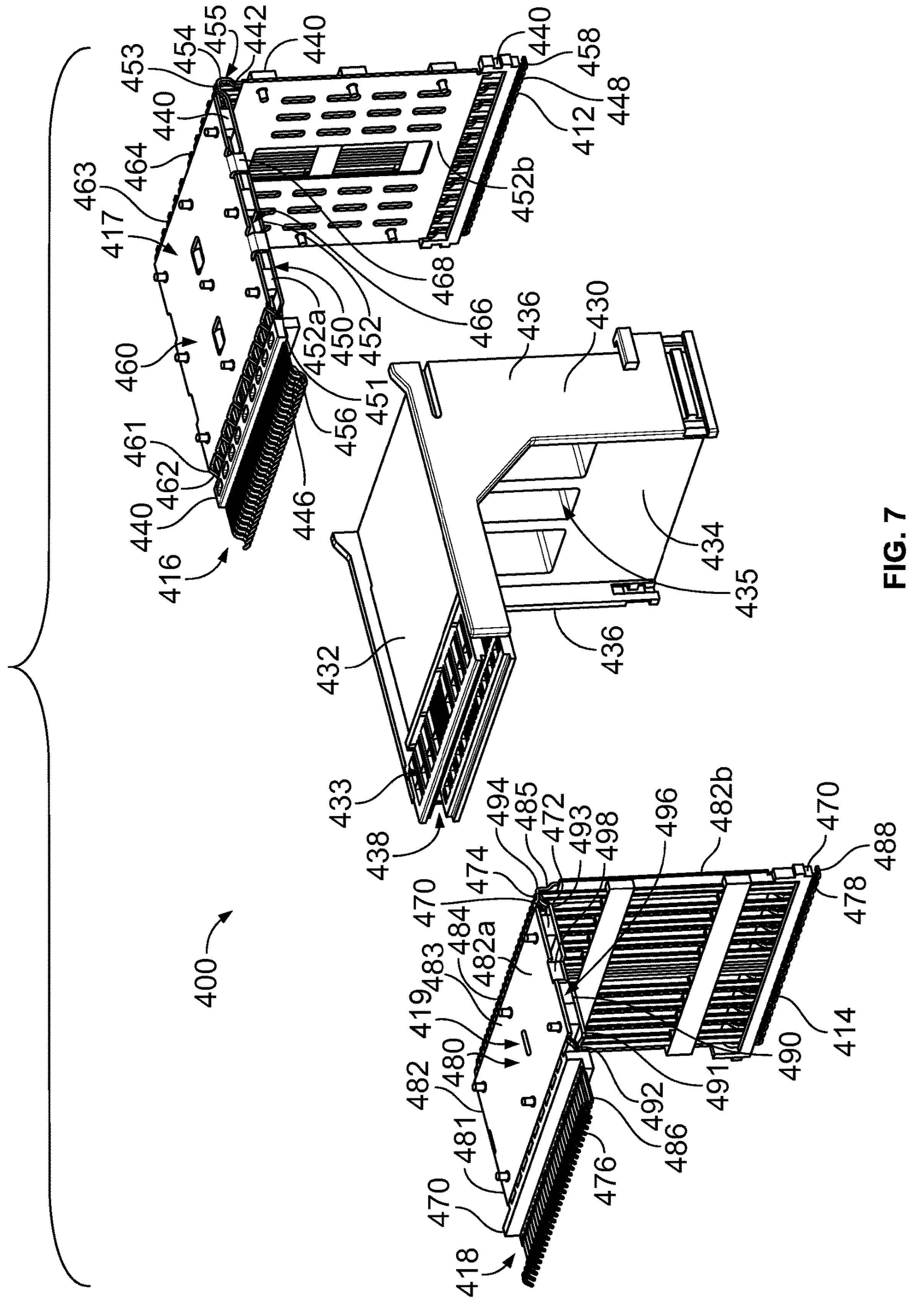
FIG. 7 is an exploded view of the outer contact assembly in accordance with an exemplary embodiment.

FIG. 7 is an exploded view of the outer contact assembly 400 in accordance with an exemplary embodiment. The inner contact assembly 300 may include similar components as the outer contact assembly 400, which may be sized and shaped differently for loading into the housing 200. The outer contact assembly 400 includes an outer contact positioner 430 supporting the upper contact array 416 and the lower contact array 418.

The outer contact positioner 430 is used to position the upper and lower contacts 412, 414 relative to each other. The outer contact positioner 430 is used to hold the contact arrays 416, 418 for loading the outer contact assembly 400 into the housing 200 (shown in FIG. 4). In an exemplary embodiment, the contacts 412, 414 are movable relative to the outer contact positioner 430 for proper alignment and positioning for mating with the pluggable module 106 and mounting to the host circuit board 102.

The outer contact positioner 430 includes a central wall 432, a rear wall 434, and side walls 436 along the sides of the central wall 432 and the rear wall 434. The central wall 432 extends forward from the rear wall 434 to a front of the outer contact positioner 430. The central wall 432 may be oriented generally perpendicular to the rear wall 434. The central wall 432 may be oriented horizontally. The rear wall 434 may be oriented vertically. The central wall 432 may include openings 433, such as to receive the upper contacts 412 and/or the lower contacts 414, such as to position the upper and lower contacts 412, 414 for mating with the module circuit board 190. The rear wall 434 may include openings 435, such as for airflow through the rear wall 434. The outer contact positioner 430 has an outer positioner card slot 438 in the central wall 432 at the front. The outer positioner card slot 438 is configured to receive the card edge 192 of the module circuit board 190 (shown in FIG. 2).

The upper and lower contact arrays 416, 418 are located between the side walls 436. The central wall 432 and the rear wall 434 hold the upper and lower contact arrays 416, 418. For example, the upper contact array 416 is located above the central wall 432 and rearward of the rear wall 434. The lower contact array 418 is located below the central wall 432 and forward of the rear wall 434.

In an exemplary embodiment, the upper contact array 416 includes the upper contacts 412 and an upper shield structure 417 providing electrical shielding for the upper contacts 412. In an exemplary embodiment, the upper contact array 416 includes a signal leadframe forming the upper contacts 412. The signal leadframe is a stamped and formed lead-frame to form the upper contacts 412. The signal leadframe may be overmolded with one or more overmolded bodies to hold the relative positions of the upper contacts 412. For example, the upper contact array 416 includes one or more upper contact holders 440 holding the upper contacts 412. The upper contact holders 440 may be overmolded bodies overmolded over the upper contacts 412. The upper contact holders 440 may extend side-to-side across the width of the upper contact array 416 to hold each of the upper contacts 412. The upper contact holders 440 may be coupled to the outer contact positioner 430 to position the upper contact array 416 relative to the outer contact positioner 430. The mating ends of the upper contacts 412 are arranged in a row; however the upper contacts may be arranged in multiple rows. The mounting ends of the upper contacts 412 may be arranged in a row; however the mounting ends may be arranged in multiple rows.

Figure 8:
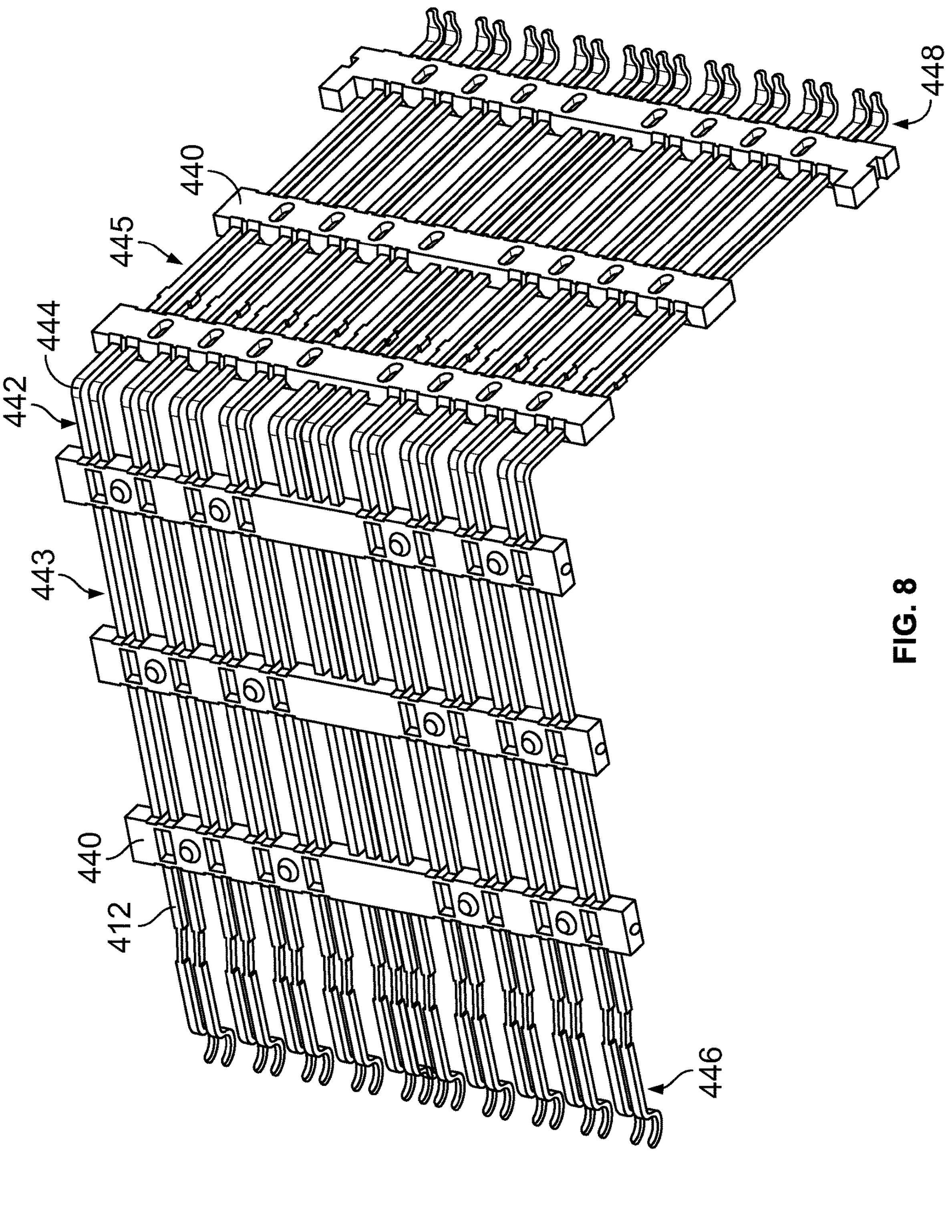
FIG. 8 is a rear perspective view of the leadframe of the upper contact array showing the upper contacts held by the upper contact holders in accordance with an exemplary embodiment.

With additional reference to FIG. 8, which is a rear perspective view of the leadframe of the upper contact array 416, the upper contacts 412 are shown held by the upper contact holders 440. Each upper contact 412 includes a transition portion 442 extending between a mating beam 446 at a mating end and a contact tail 448 at a terminating end. In an exemplary embodiment, the upper contacts 412 are right angle contacts having the mating beams 446 oriented generally perpendicular to the contact tails 448. The transition portion 442 includes one or more bends 444, such as 90° bends. The transition portion 442 includes a forward section 443 and a rearward section 445. The bend 444 is located between the forward section 443 and the rearward section 445. In an exemplary embodiment, a plurality of the contact holders 440 are coupled to the forward sections 443 to support the forward sections 443 and a plurality of the contact holders 440 are coupled to the rearward sections 445 to support the rearward sections 445. The mating beams 446 extend from the forward sections 443 for mating with the module circuit board 190. The mating beams 446 are independently movable relative to each other. The contact tails 448 extend from the rearward sections 445 for mating with the host circuit board 102. For example, the contact tails 448 may be solder tails configured to be soldered to the host circuit board 102.

In an exemplary embodiment, the upper contacts 412 are signal contacts. The signal contacts may be arranged in pairs, such as configured to convey differential signals. In various embodiments, some of the upper contacts 412 may be ground contacts interspersed between signal contacts or pairs of signal contacts. In an exemplary embodiment, the upper contacts 412 are flexible and configured to be elastically deformed and flexed, such as during assembly and during mating with the module circuit board 190. The mating beams 446 may be cantilevered spring beams configured to be flexed when mated with the module circuit board 190. The contact tails 448 may be flexed when mounted to the host circuit board 102.

Returning to FIG. 7, the upper shield structure 417 of the upper contact array 416 provides electrical shielding for the upper contacts 412. The upper shield structure 417 extends along the transition portions 442, the mating beams 446, and the contact tails 448. In an exemplary embodiment, the upper shield structure 417 includes an upper ground shield 450 and an upper ground plate 460 coupled to the upper ground shield 450. The upper ground shield 450 extends along first sides (for example, bottom sides) of the upper contacts 412. The upper ground plate 460 extends along second sides (for example, upper sides) of the upper contacts 412.

The upper ground shield 450 includes one or more upper ground panels 452 (for example, forward and rearward ground panels 452*a*, 452*b*). The ground panel(s) 452 are planar. In an exemplary embodiment, the ground panels 452 span the entire width of the upper contact array 416 to cover all of the upper contacts 412. The ground panels 452 may cover a majority of the lengths of the upper contacts 412. In an exemplary embodiment. The forward ground panel 452*a* is located below the forward sections 443 of the upper contacts 412. The rearward ground panel 452*b* is located forward of the rearward sections 445 of the upper contacts 412.

In an exemplary embodiment, the upper ground shield 450 includes transition beams 454 extending between the forward and rearward ground panels 452*a*, 452*b*. The transition beams 454 include one or more bends 455, such as 90° bends. The transition beams 454 are configured to be located between the bends 444 of the upper contacts 412, to provide electrical shielding between the upper contacts 412, such as between pairs of the upper contacts 412. The upper ground panel 452 includes a front edge 451 and a rear edge 453.

The upper ground shield 450 includes ground beams 456 extending from the front edge 451 of the forward ground panel 452*a*. The ground beams 456 are located between the mating beams 446, such as between pairs of the mating beams 446. The ground beams 456 are deflectable beams configured to be mated with the module circuit board 190. The upper ground shield 450 includes ground tails 458 extending from the rear edge 453 of the rearward ground panel 452*b*. The ground tails 458 are located between the contact tails 448, such as between pairs of the contact tails 448. The ground tails 458 may be solder tails, compliant tails, or other components that may be terminated to the host circuit board 102.

The upper ground plate 460 is planar. In an exemplary embodiment, the upper ground plate 460 spans the entire width of the upper contact array 416 to cover all of the upper contacts 412. The upper ground plate 460 is located above the forward sections 443 of the upper contacts 412. The upper ground plate 460 may cover a majority of the lengths of the forward sections 443 of the upper contacts 412. In an exemplary embodiment, the upper ground plate 460 includes a front edge 461 and a rear edge 463. The upper ground plate 460 includes front connecting beams 462 extending from the front edge 461 and rear connecting beams 464 extending from the rear edge 463. The connecting beams 462, 464 are coupled to the upper ground shield 450. The connecting beams 462, 464 are used to electrically connect the upper ground plate 460 to the upper ground shield 450, such as to the upper ground panel 452. The connecting beams 462, 464 may extend between the upper contacts 412, such as between the mating beams 446, such as between pairs of the mating beams 446.

In an exemplary embodiment, an upper shield space 466 is defined between the upper ground panel 452 and the upper ground plate 460. The upper contacts 412, such as the forward sections 443, are located in the upper shield space 466 between the upper ground panel 452 and the upper ground plate 460. The upper contact holders 440 are located in the upper shield space 466. The upper contact holders 440 may be used to control the spacing between the upper ground panel 452 and the upper ground plate 460. For example, the thicknesses of the upper contact holders control the spacing between the upper ground panel 452 and the upper ground plate 460.

In an exemplary embodiment, connecting tabs 468 extend between the upper ground panel 452 and the upper ground plate 460. The connecting tabs 468 are located along the sides of the upper contact array 416. The connecting tabs 468 may be integral with (for example, stamped and formed with) the upper ground panel 452 and/or the upper ground plate 460. The connecting tabs 468 may be used to position the upper ground panel 452 relative to the upper ground plate 460.

In an exemplary embodiment, the lower contact array 418 may be similar to the upper contact array 416 and include similar components, which may be sized and shaped differently to fit within the outer contact positioner 430. The lower contact array 418 includes the lower contacts 414 and a lower shield structure 419 providing electrical shielding for the lower contacts 414. In an exemplary embodiment, the lower contact array 418 includes a signal leadframe forming the lower contacts 414. The lower contact array 418 includes one or more lower contact holders 470 holding the lower contacts 414. The lower contact holders 470 may be overmolded bodies overmolded over the lower contacts 414. The lower contact holders 470 extend side-to-side across the width of the lower contact array 418 to hold each of the lower contacts 414.

Each lower contact 414 includes a transition portion 472 extending between a mating beam 476 at a mating end and a contact tail 478 at a terminating end. In an exemplary embodiment, the lower contacts 414 are right angle contacts having the mating beams 476 oriented generally perpendicular to the contact tails 478. The transition portion 472 includes one or more bends 474, such as 90° bends. The transition portion 472 includes a forward section (not shown) and a rearward section (not shown). The bend 474 is located between the forward section and the rearward section. In an exemplary embodiment, a plurality of the contact holders 470 are coupled to the forward sections to support the forward sections and a plurality of the contact holders 470 are coupled to the rearward sections to support the rearward sections. The mating beams 476 extend from the forward sections for mating with the module circuit board 190. The mating beams 476 are independently movable relative to each other. The contact tails 478 extend from the rearward sections for mating with the host circuit board 102. For example, the contact tails 478 may be solder tails configured to be soldered to the host circuit board 102.

The lower shield structure 419 of the lower contact array 418 provides electrical shielding for the lower contacts 414. The lower shield structure 419 extends along the transition portions 472, the mating beams 476, and the contact tails 478. In an exemplary embodiment, the lower shield structure 419 includes a lower ground shield 480 and a lower ground plate 490 coupled to the lower ground shield 480. The lower ground shield 480 extends along first sides (for example, bottom sides) of the lower contacts 414. The lower ground plate 490 extends along second sides (for example, lower sides) of the lower contacts 414.

The lower ground shield 480 includes one or more lower ground panels 482 (for example, forward and rearward ground panels 482*a*, 482*b*). The ground panel(s) 482 are planar. In an exemplary embodiment, the ground panels 482 span the entire width of the lower contact array 418 to cover all of the lower contacts 414. The ground panels 482 may cover a majority of the lengths of the lower contacts 414. In an exemplary embodiment. The forward ground panel 482*a* is located above the forward sections of the lower contacts 414. The rearward ground panel 482*b* is located rearward of the rearward sections of the lower contacts 414. In an exemplary embodiment, transition beams 484 extend between the forward and rearward ground panels 482*a*, 482*b*. The transition beams 484 include one or more bends 485, such as 90° bends. The transition beams 484 are configured to be located between the bends 474 of the lower contacts 414, to provide electrical shielding between the lower contacts 414, such as between pairs of the lower contacts 414. The lower ground panel 482 includes a front edge 481 and a rear edge 483. The lower ground shield 480 includes ground beams 486 extending from the front edge 481 of the forward ground panel 482*a*. The ground beams 486 are located between the mating beams 476, such as between pairs of the mating beams 476. The lower ground shield 480 includes ground tails 488 extending from the rear edge 483 of the rearward ground panel 482*b*. The ground tails 488 are located between the contact tails 478, such as between pairs of the contact tails 478.

The lower ground plate 490 is planar. In an exemplary embodiment, the lower ground plate 490 spans the entire width of the lower contact array 418 to cover all of the lower contacts 414. The lower ground plate 490 is located below the forward sections of the lower contacts 414. The lower ground plate 490 may cover a majority of the lengths of the forward sections of the lower contacts 414. In an exemplary embodiment, the lower ground plate 490 includes a front edge 491 and a rear edge 493. The lower ground plate 490 includes front connecting beams 492 extending from the front edge 491 and rear connecting beams 494 extending from the rear edge 493. The connecting beams 492, 494 are coupled to the lower ground shield 480. The connecting beams 492, 494 are used to electrically connect the lower ground plate 490 to the lower ground shield 480, such as to the lower ground panel 482. The connecting beams 492, 494 may extend between the lower contacts 414, such as between the mating beams 476, such as between pairs of the mating beams 476.

In an exemplary embodiment, a lower shield space 496 is defined between the lower ground panel 482 and the lower ground plate 490. The lower contacts 414, such as the forward sections, are located in the lower shield space 496 between the lower ground panel 482 and the lower ground plate 490. The lower contact holders 470 are located in the lower shield space 496. The lower contact holders 470 may be used to control the spacing between the lower ground panel 482 and the lower ground plate 490. For example, the thicknesses of the lower contact holders control the spacing between the lower ground panel 482 and the lower ground plate 490.

In an exemplary embodiment, connecting tabs 498 extend between the lower ground panel 482 and the lower ground plate 490. The connecting tabs 498 are located along the sides of the lower contact array 418. The connecting tabs 498 may be integral with (for example, stamped and formed with) the lower ground panel 482 and/or the lower ground plate 490. The connecting tabs 498 may be used to position the lower ground panel 482 relative to the lower ground plate 490.

Figure 9:
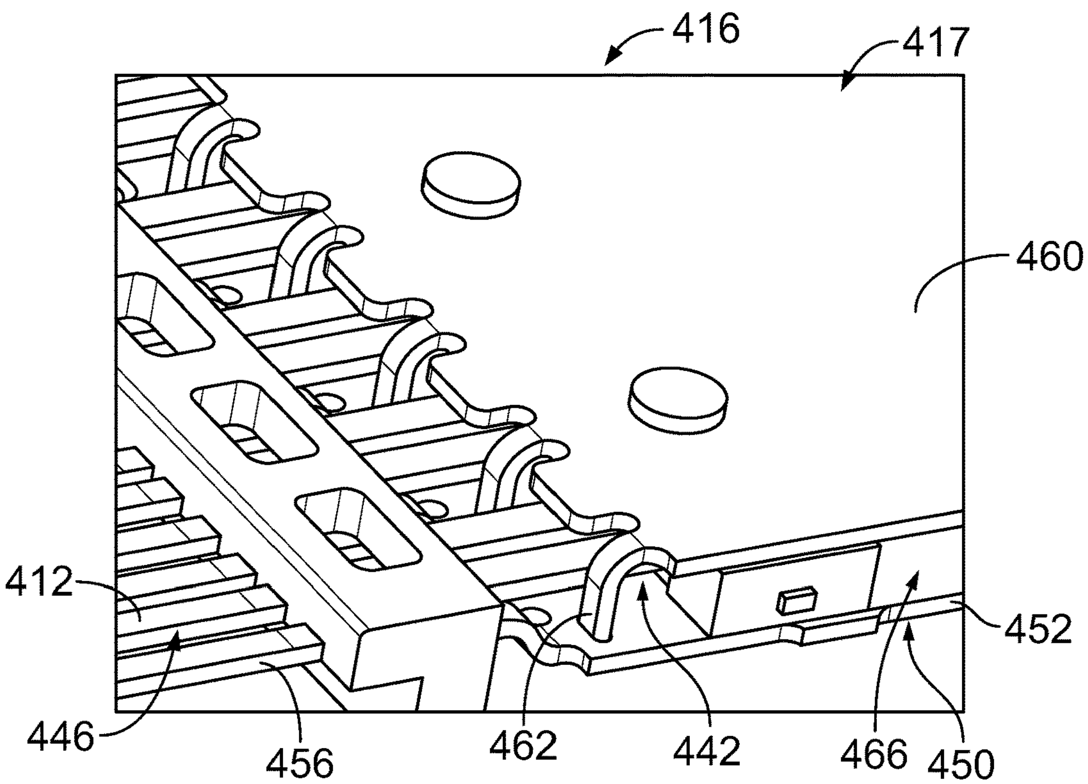
FIG. 9 is a front perspective view of a portion of the upper contact array in accordance with an exemplary embodiment.
Figure 10:
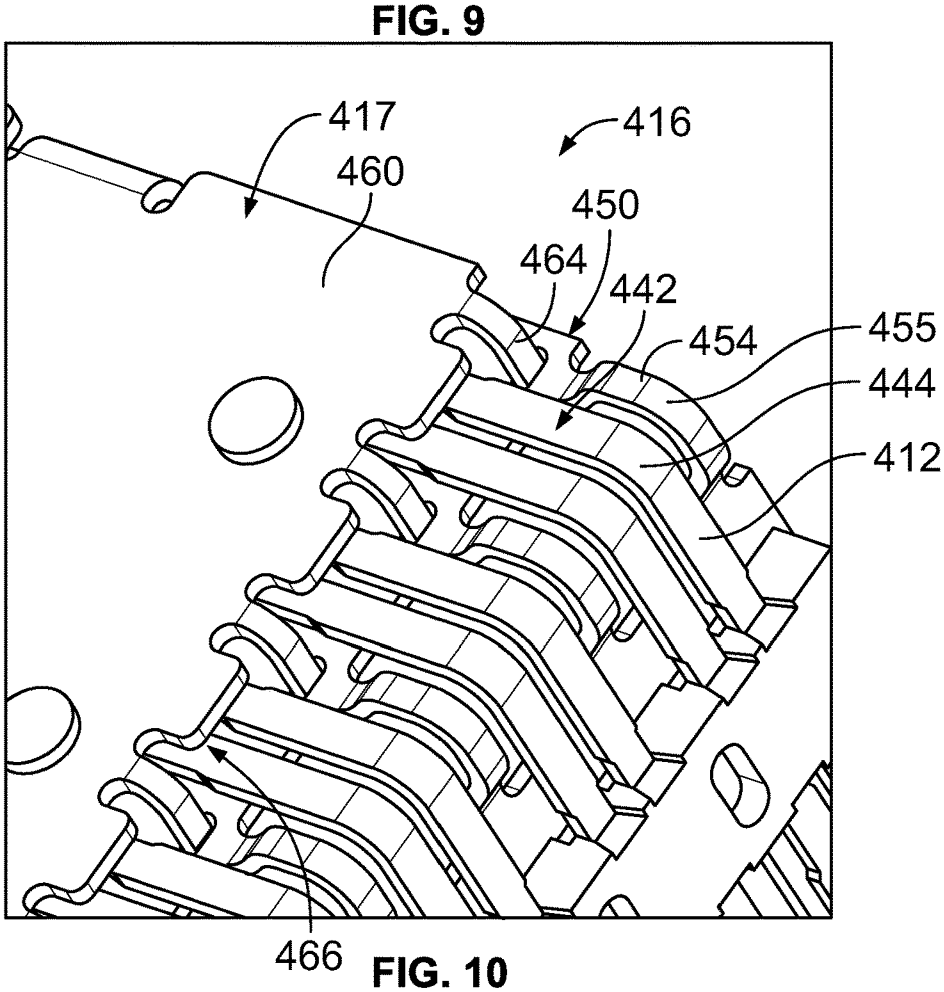
FIG. 10 is a rear perspective view of a portion of the upper contact array in accordance with an exemplary embodiment.

FIG. 9 is a front perspective view of a portion of the upper contact array 416 in accordance with an exemplary embodiment. FIG. 10 is a rear perspective view of a portion of the upper contact array 416 in accordance with an exemplary embodiment. FIGS. 9 and 10 illustrate portions of the upper contacts 412 and the upper shield structure 417. The upper shield structure 417 includes the upper ground shield 450 (for example the upper ground panels 452, the transition beams 454, the ground beams 456 and the ground tails) and upper ground plate 460.

The upper shield structure 417 provides electrical shielding for the upper contacts 412. The upper shield structure 417 extends along the transition portions 442. The upper ground panel 452 of the upper shield structure 417 defines a primary ground for the signals. The upper ground plate 460 of the upper shield structure 417 defines a secondary ground for the signals. The transition portions 442 extend through the upper shield space 466 between the upper ground panel 452 and the upper ground plate 460. The transition beams 454, including the bends 455, transition out of the plane of the upper ground panel 452 into alignment with the transition portions 442, including the bends 444, to provide shielding between the pairs of upper contacts 412. The ground beams 456 transition out of the plane of the upper ground panel 452 into alignment with the mating beams 446 to provide shielding between the pairs of upper contacts 412. The upper ground shield 450 reduces cross-talk between the upper contacts 412. The transition portions 442 of the upper contacts 412 are closely coupled to the upper shield structure 417, such as the upper ground panel 452 and the upper ground plate 460, to reduce broadband in-row cross talk between the upper contacts 412. The addition of the upper ground plate 460 improves electrical performance, allowing operation at high data rates.

The upper ground plate 460 includes the front connecting beams 462 and the rear connecting beams 464. The connecting beams 462, 464 are coupled to the upper ground shield 450. For example, the connecting beams 462, 464 may be received in slots or openings in the upper ground panel 452. The connecting beams 462, 464 may engage the upper ground panel 452 by an interference fit to electrically connect the upper ground plate 460 to the upper ground shield 450. In other embodiments, the connecting beams 462, 464 may be welded or soldered to the upper ground shield 450, such as being laser welded to the upper ground shield 450. In an exemplary embodiment, the connecting beams 462, 464 are coupled to the upper ground panel 452. In alternative embodiments, the connecting beams 462, 464 may be coupled to the ground beams 456 and the transition beams 454, respectively. The connecting beams 462, 464 may extend between the upper contacts 412, such as between the mating beams 446, such as between pairs of the mating beams 446.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contact assembly comprising:

a contact positioner having a central wall and a rear wall, the contact positioner including a front slot at a front of the contact positioner configured to receive a card edge of a module circuit board of a pluggable module;

an upper contact array coupled to the contact positioner, the upper contact array including upper contacts held by an upper contact holder, the upper contacts extending to the front slot to mate with the module circuit board, the upper contact array including an upper ground shield having an upper ground panel extending along a first side of the upper contacts, the upper contact array including an upper ground plate extending along a second side of the upper contacts, the second side of the upper contacts being opposite the first side of the upper contacts, the upper ground plate being parallel to and spaced apart from the upper ground panel, wherein the upper contacts pass between the upper ground plate and the upper ground panel in a space defined therebetween along a majority of lengths of the upper contacts, the upper ground plate being electrically connected to the upper ground shield; and a lower contact array coupled to the contact positioner, the lower contact array including lower contacts held by a lower contact holder, the lower contacts extending to the front slot to mate with the module circuit board, the lower contact array including a lower ground shield having a lower ground panel extending along a first side of the lower contacts, the lower contact array including a lower ground plate extending along a second side of the lower contacts, the second side of the lower contacts being opposite the first side of the lower contacts, the lower ground plate being parallel to and spaced apart from the lower ground panel, wherein the lower contacts pass between the lower ground plate and the lower ground panel in a space defined therebetween along a majority of lengths of the lower contacts, the lower ground plate being electrically connected to the lower ground shield.

2. The contact assembly of claim 1, wherein an upper shield space is defined between the upper ground panel and the upper ground plate, the upper contacts passing through the upper shield space, and wherein a lower shield space is defined between the lower ground panel and the lower ground plate, the lower contacts passing through the lower shield space.

3. The contact assembly of claim 1, wherein the upper ground panel is coupled to the upper contact holder, the upper ground plate being coupled to the upper contact holder, the upper contact holder locating the upper ground panel relative to the upper ground plate, the upper contact holder locating the upper ground panel and the upper ground plate relative to the upper contacts, and wherein the lower ground panel is coupled to the lower contact holder, the lower ground plate being coupled to the lower contact holder, the lower contact holder locating the lower ground panel relative to the lower ground plate, the lower contact holder locating the lower ground panel and the lower ground plate relative to the lower contacts.

4. The contact assembly of claim 1, wherein the upper ground panel and the upper ground plate are oriented parallel to the central wall, and wherein the lower ground panel and the lower ground plate are oriented parallel to the central wall.

5. The contact assembly of claim 1, wherein the upper ground shield includes ground beams extending from the upper ground panel, the ground beams being interspersed with the upper contacts to provide shielding between the corresponding upper contacts, and wherein the lower ground shield includes ground beams extending from the lower ground panel, the ground beams being interspersed with the lower contacts to provide shielding between the corresponding lower contacts.

6. The contact assembly of claim 1, wherein the upper ground plate includes connecting beams extending between corresponding upper contacts to interface with and electrically connect to the upper ground shield, and wherein the lower ground plate includes connecting beams extending between corresponding lower contacts to interface with and electrically connect to the lower ground shield.

7. The contact assembly of claim 1, wherein the upper ground plate is laser welded to the upper ground shield, and wherein the lower ground plate is laser welded to the lower ground shield.

8. The contact assembly of claim 1, wherein the upper ground panel is located between the upper contacts and the central wall, and wherein the lower ground panel is located between the lower contacts and the central wall.

9. The contact assembly of claim 1, wherein the upper ground panel extends an entire width of the upper contact assembly to cover the first sides of all of the upper contacts and the upper ground plate extends the entire width of the upper contact assembly to cover the second sides of all of the upper contacts, and wherein the lower ground panel extends an entire width of the lower contact assembly to cover the first sides of all of the lower contacts and the lower ground plate extends the entire width of the lower contact assembly to cover the second sides of all of the lower contacts.

10. The contact assembly of claim 1, wherein the upper contacts include forward sections and rearward sections with 90° bends between the forward sections and the rearward sections, the forward sections extending along the central wall, the rearward sections extending along the rear wall, the upper ground panel covering the forward sections, the upper ground plate covering the forward sections, the upper ground shield including an upper rear ground panel covering the rearward sections, and wherein the lower contacts include forward sections and rearward sections with 90° bends between the forward sections and the rearward sections, the forward sections extending along the central wall, the rearward sections extending along the rear wall, the lower ground panel covering the forward sections, the lower ground plate covering the forward sections, the lower ground shield including a lower rear ground panel covering the rearward sections.

11. The contact assembly of claim 1, wherein the upper ground panel defines a primary ground for the upper contacts and the upper ground plate defines a secondary ground for the upper contacts, and wherein the lower ground panel defines a primary ground for the lower contacts and the lower ground plate defines a secondary ground for the lower contacts.

12. The contact assembly of claim 1, wherein the upper ground panel extends between a front edge and a rear edge, the upper ground panel including ground beams extending forward from the front edge, the upper ground plate extending between a front edge and a rear edge, the upper ground plate including front connecting beams extending from the front edge of the upper ground plate and a rear connecting beams extending from the rear edge of the upper ground plate, the front connecting beams interfacing with the upper ground panel proximate to the front edge of the upper ground panel, the rear connecting beams interfacing with the upper ground panel proximate to the rear edge of the upper ground panel, and wherein the lower ground panel extends between a front edge and a rear edge, the lower ground panel including ground beams extending forward from the front edge, the lower ground plate extending between a front edge and a rear edge, the lower ground plate including front connecting beams extending from the front edge of the lower ground plate and a rear connecting beams extending from the rear edge of the lower ground plate, the front connecting beams interfacing with the lower ground panel proximate to the front edge of the lower ground panel, the rear connecting beams interfacing with the lower ground panel proximate to the rear edge of the lower ground panel.

13. A card edge connector for mating with a pluggable module, the card edge connector comprising:

a housing including a top and a bottom, the housing having a front and a rear, the housing having a first side and a second side, the bottom configured to be mounted to a host circuit board, the housing including a cavity at the rear, the housing including a card slot open to the cavity at the front of the housing, the card slot configured to receive a card edge of a module circuit board of the pluggable module;

a contact assembly received in the cavity, the contact assembly having a contact positioner holding an upper contact array and a lower contact array;

the contact positioner having a central wall and a rear wall, the contact positioner received in the cavity and coupled to the housing, the contact positioner including a front slot aligned with the card slot to receive the card edge of the module circuit board;

the upper contact array including upper contacts held by an upper contact holder, the upper contacts extending to the front slot to mate with the module circuit board, the upper contact array including an upper ground shield having an upper ground panel extending along a first side of the upper contacts, the upper contact array including an upper ground plate extending along a second side of the upper contacts, the second side of the upper contacts being opposite the first side of the upper contacts, the upper ground plate being parallel to and spaced apart from the upper ground panel, wherein the upper contacts pass between the upper ground plate and the upper ground panel in a space defined therebetween along a majority of lengths of the upper contacts, the upper ground plate being electrically connected to the upper ground shield; and the lower contact array including lower contacts held by a lower contact holder, the lower contacts extending to the front slot to mate with the module circuit board, the lower contact array including a lower ground shield having a lower ground panel extending along a first side of the lower contacts, the lower contact array including a lower ground plate extending along a second side of the lower contacts, the second side of the lower contacts being opposite the first side of the lower contacts, the lower ground plate being parallel to and spaced apart from the lower ground panel, wherein the lower contacts pass between the lower ground plate and the lower ground panel in a space defined therebetween along a majority of lengths of the lower contacts, the lower ground plate being electrically connected to the lower ground shield.

14. The card edge connector of claim 13, wherein an upper shield space is defined between the upper ground panel and the upper ground plate, the upper contacts passing through the upper shield space, and wherein a lower shield space is defined between the lower ground panel and the lower ground plate, the lower contacts passing through the lower shield space.

15. The contact assembly of claim 13, wherein the upper ground panel is coupled to the upper contact holder, the upper ground plate being coupled to the upper contact holder, the upper contact holder locating the upper ground panel relative to the upper ground plate, the upper contact holder locating the upper ground panel and the upper ground plate relative to the upper contacts, and wherein the lower ground panel is coupled to the lower contact holder, the lower ground plate being coupled to the lower contact holder, the lower contact holder locating the lower ground panel relative to the lower ground plate, the lower contact holder locating the lower ground panel and the lower ground plate relative to the lower contacts.

16. The contact assembly of claim 13, wherein the upper ground shield includes ground beams extending from the upper ground panel, the ground beams being interspersed with the upper contacts to provide shielding between the corresponding upper contacts, and wherein the lower ground shield includes ground beams extending from the lower ground panel, the ground beams being interspersed with the lower contacts to provide shielding between the corresponding lower contacts.

17. The contact assembly of claim 13, wherein the upper ground plate includes connecting beams extending between corresponding upper contacts to interface with and electrically connect to the upper ground shield, and wherein the lower ground plate includes connecting beams extending between corresponding lower contacts to interface with and electrically connect to the lower ground shield.

18. The contact assembly of claim 13, wherein the upper ground panel extends an entire width of the upper contact assembly to cover the first sides of all of the upper contacts and the upper ground plate extends the entire width of the upper contact assembly to cover the second sides of all of the upper contacts, and wherein the lower ground panel extends an entire width of the lower contact assembly to cover the first sides of all of the lower contacts and the lower ground plate extends the entire width of the lower contact assembly to cover the second sides of all of the lower contacts.

19. The contact assembly of claim 13, wherein the upper contacts include forward sections and rearward sections with 90° bends between the forward sections and the rearward sections, the forward sections extending along the central wall, the rearward sections extending along the rear wall, the upper ground panel covering the forward sections, the upper ground plate covering the forward sections, the upper ground shield including an upper rear ground panel covering the rearward sections, and wherein the lower contacts include forward sections and rearward sections with 90° bends between the forward sections and the rearward sections, the forward sections extending along the central wall, the rearward sections extending along the rear wall, the lower ground panel covering the forward sections, the lower ground plate covering the forward sections, the lower ground shield including a lower rear ground panel covering the rearward sections.

20. A card edge connector for mating with a pluggable module, the card edge connector comprising:

a housing including a top and a bottom, the housing having a front and a rear, the housing having a first side and a second side, the bottom configured to be mounted to a host circuit board, the housing including a cavity at the rear, the housing including an inner contact channel and an outer contact channel, the inner contact channel closer to the bottom and the host circuit board, the housing including an inner card slot open to the inner contact channel at the front of the housing, the housing including an outer card slot open to the outer contact channel at the front of the housing, the inner and outer card slots configured to receive card edges of module circuit boards of the stacked pluggable modules;

an inner contact assembly received in the cavity, the inner contact assembly having an inner contact positioner holding inner contacts, the inner contact positioner is positioned in the inner contact channel aligned with the inner card slot to receive the card edge of the module circuit board, the inner contacts configured to be electrically connected to the host circuit board and configured to be electrically connected to the corresponding module circuit board; and an outer contact assembly received in the cavity, the outer contact assembly having an outer contact positioner holding outer contacts in an upper contact array and a lower contact array, the outer contacts configured to be electrically connected to the host circuit board and configured to be electrically connected to the corresponding module circuit board, the outer contact positioner including a front slot aligned with the outer card slot to receive the card edge of the corresponding module circuit board, the upper contact array including upper contacts held by an upper contact holder, the upper contacts extending to the front slot to mate with the module circuit board, the upper contact array including an upper ground shield having an upper ground panel extending along a first side of the upper contacts, the upper contact array including an upper ground plate extending along a second side of the upper contacts, the second side of the upper contacts being opposite the first side of the upper contacts, the upper ground plate being parallel to and spaced apart from the upper ground panel, wherein the upper contacts pass between the upper ground plate and the upper ground panel in a space defined therebetween along a majority of lengths of the upper contacts, the upper ground plate being electrically connected to the upper ground shield, the lower contact array including lower contacts held by a lower contact holder, the lower contacts extending to the front slot to mate with the module circuit board, the lower contact array including a lower ground shield having a lower ground panel extending along a first side of the lower contacts, the lower contact array including a lower ground plate extending along a second side of the lower contacts, the second side of the lower contacts being opposite the first side of the lower contacts, the lower ground plate being parallel to and spaced apart from the lower ground panel, wherein the lower contacts pass between the lower ground plate and the lower ground panel in a space defined therebetween along a majority of lengths of the lower contacts, the lower ground plate being electrically connected to the lower ground shield.

* * * * *